(12) United States Patent
Tamaki et al.

(10) Patent No.: US 7,676,309 B2
(45) Date of Patent: Mar. 9, 2010

(54) MOTOR-DRIVEN POWER STEERING APPARATUS

(75) Inventors: Akihiro Tamaki, Tochigi (JP); Shunya Senda, Tochigi (JP)

(73) Assignee: Showa Corporation, Saitama (JP)

( * ) Notice: Subject to any disclaimer, the term of this patent is extended or adjusted under 35 U.S.C. 154(b) by 491 days.

(21) Appl. No.: 11/443,408

(22) Filed: May 30, 2006

(65) Prior Publication Data
US 2007/0144824 A1 Jun. 28, 2007

(30) Foreign Application Priority Data
Dec. 26, 2005 (JP) ............................. 2005-373241

(51) Int. Cl.
*A01B 69/00* (2006.01)
(52) U.S. Cl. .................... 701/41; 701/42; 280/5.51; 180/422; 180/443; 180/6.2
(58) Field of Classification Search .................. 701/36, 701/70, 80, 40, 41; 180/6.2, 422, 443; 280/5.51
See application file for complete search history.

(56) References Cited

U.S. PATENT DOCUMENTS

| | | | |
|---|---|---|---|
| 6,556,911 B2 * | 4/2003 | Matsuno | 701/80 |
| 6,679,350 B2 * | 1/2004 | Shimizu et al. | 180/446 |
| 2002/0125063 A1 | 9/2002 | Kurishige et al. | |
| 2004/0019417 A1 * | 1/2004 | Yasui et al. | 701/36 |
| 2005/0103561 A1 * | 5/2005 | Endo et al. | 180/443 |
| 2005/0125131 A1 * | 6/2005 | Kato et al. | 701/70 |

FOREIGN PATENT DOCUMENTS

JP 2002-120743 4/2002

OTHER PUBLICATIONS

Extended European Search Report for European Application No. 06011116.8-1523, dated May 3, 2007 (6 pages).
Patent Abstracts of Japan for Japanese Publication No. 2002120743, Publication date Apr. 23, 2002 (1 page).

* cited by examiner

*Primary Examiner*—Tuan C To
*Assistant Examiner*—Redhwan Mawari
(74) *Attorney, Agent, or Firm*—Osha • Liang LLP

(57) ABSTRACT

A motor-driven power steering apparatus is provided with a self-aligning torque computing means for computing a self-aligning torque based on of a steering angle and a vehicle speed, a friction torque computing means for computing a friction torque in accordance with a steering angle change from a steering angular velocity, an apparent steering torque computing means for computing an apparent steering torque from the friction torque and a steering torque, and a steering torque feedback control means for driving and controlling an assist motor in such a manner that a difference between the self-aligning torque and the apparent steering torque becomes 0.

6 Claims, 5 Drawing Sheets

MOTOR-DRIVEN POWER STEERING APPARATUS

BACKGROUND OF THE INVENTION

1. Field of the Invention

The present invention relates to a motor-driven power steering apparatus mounted on a motor vehicle and assisting a steering force by an electric motor.

2. Description of the Related Art

A steering torque control of a motor-driven power steering apparatus is basically structured so as to apply an assist force corresponding to a steering torque applied to a steering shaft of a steering mechanism from a motor so as to assist a steering force at a time of steering a steering wheel.

For example, in a motor-driven power steering apparatus disclosed in Japanese Patent Application Laid-open No. 2002-120743 (patent document 1), a target steering torque is estimated based on a steering angle of the steering and a vehicle speed, and a feedback control of a motor is executed based on a deviation between the target steering torque and a detected steering torque.

In the steering torque control disclosed in the patent document 1, a relation of the target steering torque with respect to the steering angle of the steering is previously determined and stored per a vehicle speed, and the target steering torque is extracted and estimated from a memory means based on the steering angle and the vehicle speed.

Since a restoring force is naturally applied to the traveling vehicle based on a self-aligning torque which the traveling wheel receives from a road surface in such a manner as to make the steering angle close to 0 (a neutral position), it is possible to assist the steering force by obtaining a torque overcoming the self-aligning torque by driving the motor, at a time of turning the wheel.

Since the self-aligning torque is different in accordance with the steering angle and the vehicle speed, it is possible to suitably assist the steering force by previously determining the target steering torque with respect to the steering angle per the vehicle speed and driving and controlling the motor based on the target steering torque.

However, since the self-aligning torque is small particularly in the low vehicle speed, a friction of a tire wheel applied to the road surface, a resistance of a power transmission system from the steering wheel and an inertia of the motor greatly act on the steering force, and a steering feeling becomes unstable.

SUMMARY OF THE INVENTION

Embodiments of the present invention provide a motor-driven power steering apparatus which can always obtain a stable steering feeling.

Embodiments of the present invention relate to a motor-driven power steering apparatus in which a driving force of an assist motor assists a steering force, comprising: a torque sensor detecting a steering torque; a vehicle speed sensor detecting a vehicle speed; a steering angle detecting means for detecting a steering angle; an angular velocity computing means for detecting a steering angle or an angular velocity of a motor rotating angle; a self-aligning torque computing means for computing a self-aligning torque based on the steering angle detected by the steering angle detecting means and the vehicle speed detected by the vehicle speed sensor; a friction torque computing means computing a friction torque in accordance with a steering angle change from the steering angular velocity computed by the angular velocity computing means; an apparent steering torque computing means for computing an apparent steering torque from the friction torque computed by the friction torque computing means and the steering torque detected by the torque sensor; and a steering torque feedback control means for driving and controlling the assist motor in such a manner that a difference between the self-aligning torque computed by the self-aligning torque computing means and the apparent steering torque computed by the apparent steering torque computing means becomes 0.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

A description will be given below of embodiments in accordance with the present invention with reference to FIGS. 1 to 6.

Figure 1:
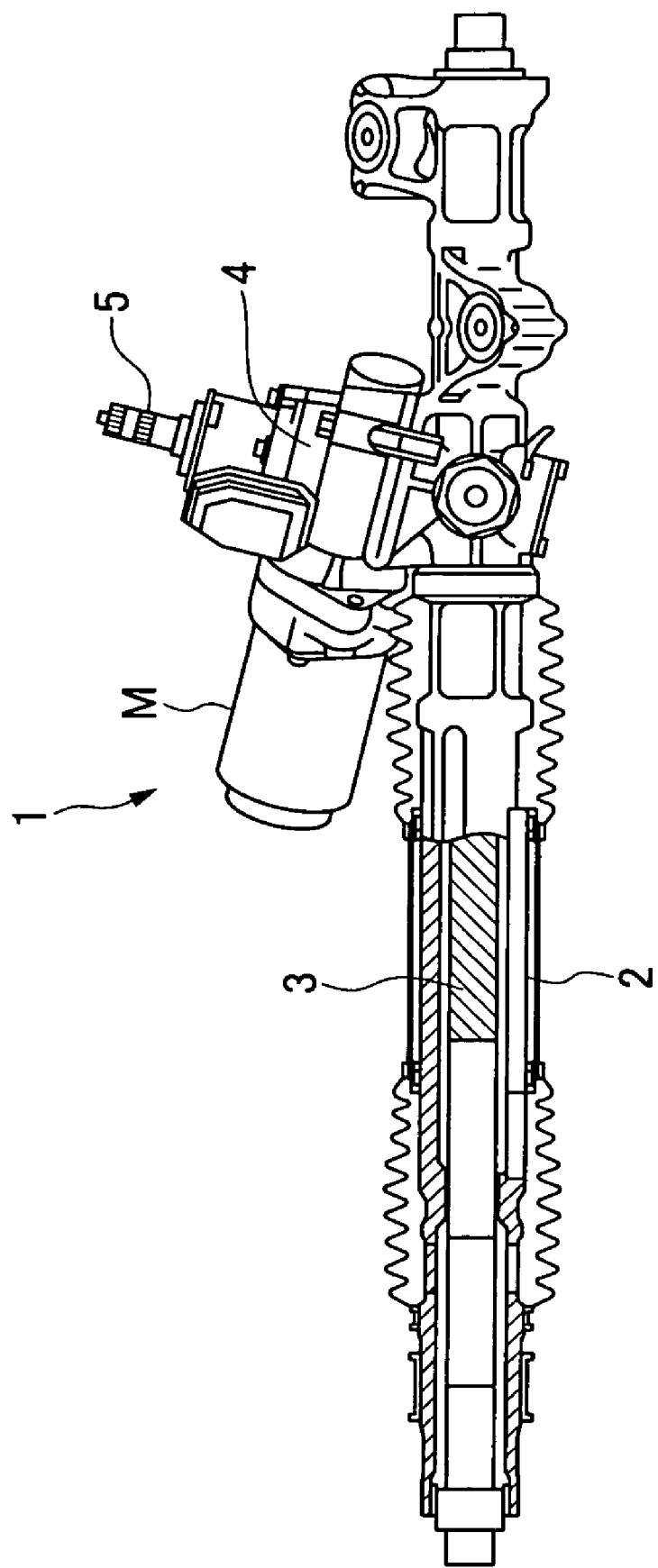
FIG. 1 is a skeleton back elevational view of an entire of a motor-driven power steering apparatus in accordance with an embodiment of the present invention.

FIG. 1 shows a skeleton back elevational view of an entire of a motor-driven power steering apparatus 1 in accordance with an embodiment of the present invention.

The motor-driven power steering apparatus 1 is structured such that a rack shaft 3 is accommodated within an approximately cylindrical rack housing 2 directed in a lateral direction of the vehicle (coinciding with a lateral direction in FIG. 1) so as to be slidable in a direction of a lateral axis.

Tie rods are respectively coupled to both end portions of the rack shaft 3 protruding from both end openings of the rack housing 2 via joints, the tie rods are moved based on a movement of the rack shaft 3, and a steered wheel of the vehicle is steered via a steering mechanism.

A steering gear box 4 is provided in a right end portion of the rack housing 2.

Figure 2:
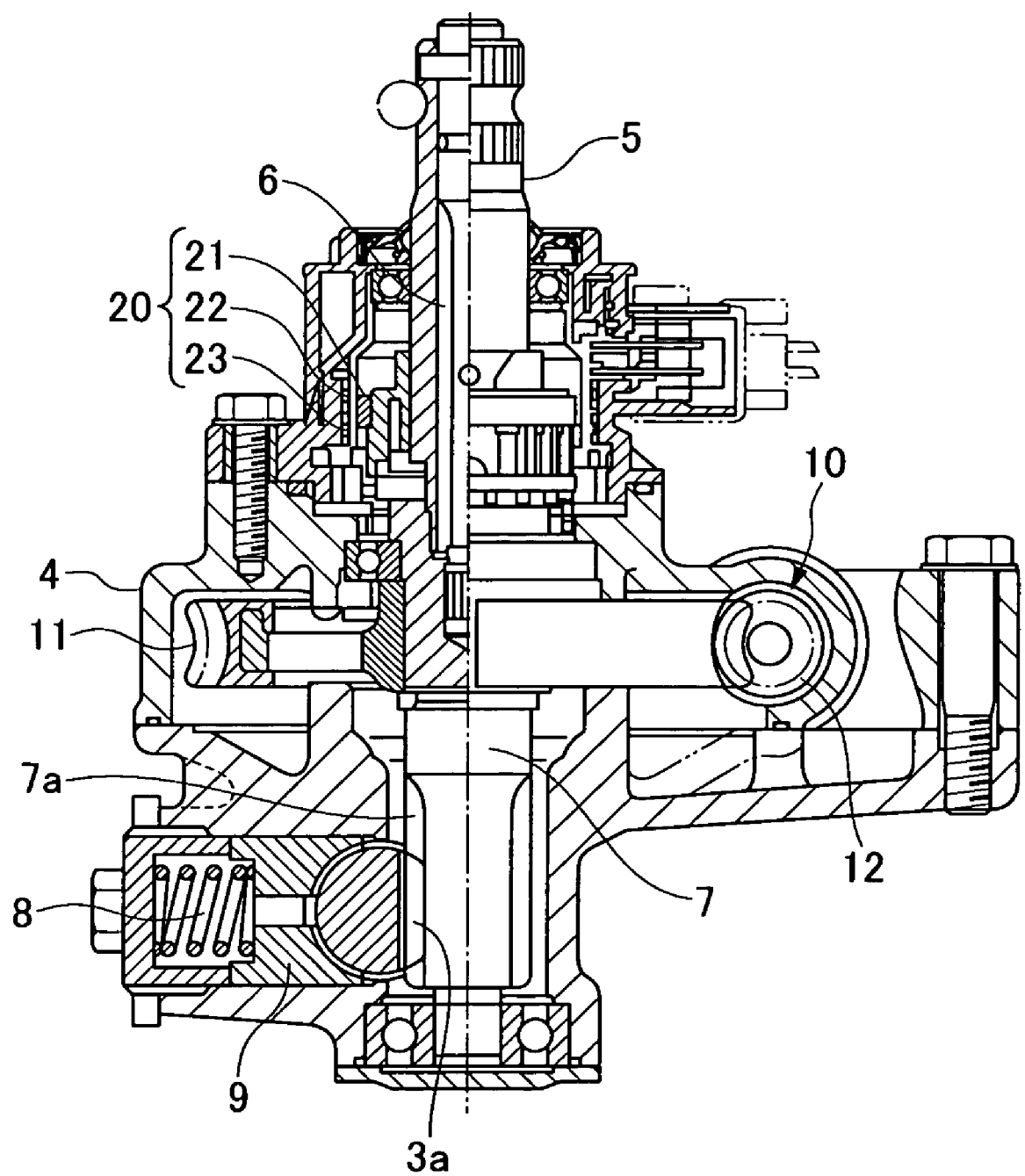
FIG. 2 is a cross sectional view showing a structure within a steering gear box.

An input shaft 5 is rotatably pivoted to the steering gear box 4 via a bearing. The input shaft 5 is coupled to a steering shaft to which a steering wheel (not shown) is integrally attached, via a joint. The input shaft 5 is coupled to a pinion shaft 7 via a torsion bar 6 within the steering gear box 4 so as to be freely twisted relatively as shown in FIG. 2.

A spiral gear 7a of the steering pinion shaft 7 is engaged with a rack gear 3a of the rack shaft 3.

Accordingly, a steering force transmitted to the input shaft 5 based on a rotating operation of the steering wheel rotates the steering pinion shaft 7 via the torsion bar 6 and slides the rack shaft 3 in a direction of a lateral axis based on an engagement between the spiral gear 7a of the steering pinion shaft 7 and the rack gear 3a.

The rack shaft 3 is pressed from a back side by a rack guide 9 energized by a rack guide spring 8.

An assist motor M is attached to an upper portion of the steering gear box 4, and a worm speed reducing mechanism 10 is structured within the steering gear box 4. The worm speed reducing mechanism 10 reduces a driving force of the assist motor M so as to transmit to the steering pinion shaft 7.

The worm speed reducing mechanism 10 is structured such that a worm 12 coaxially coupled to a drive shaft of the assist motor M is engaged with a worm wheel 11 fitted and attached to an upper portion of the steering pinion shaft 7.

The steering operation is assisted by applying the driving force of the assist motor M to the steering pinion shaft 7 via the worm speed reducing mechanism 10.

A steering torque sensor 20 is provided in a further upper side of the worm speed reducing mechanism 10.

A steering torque T is detected by converting torsion of the torsion bar 6 into a movement in an axial direction of a core 21, and changing the movement of the core 21 to an inductance change of coils 22 and 23.

In this case, it is possible to employ a torque sensor optically detecting the torsion of the torsion bar 6.

Further, the rack housing 2 is provided with a steering angle sensor 28 detecting a sliding amount of the rack shaft 3 from a neutral position as a steering angle θ.

In this case, the structure may be made such that the assist motor M is provided with a rotation angle sensor 27, such as a rotary encoder, an angular resolver, or the like, directly detecting a rotation of a rotation driving shaft of the assist motor M, and the steering angle θ is determined based on a motor rotating speed detected by the rotation angle sensor 27.

Figure 3:
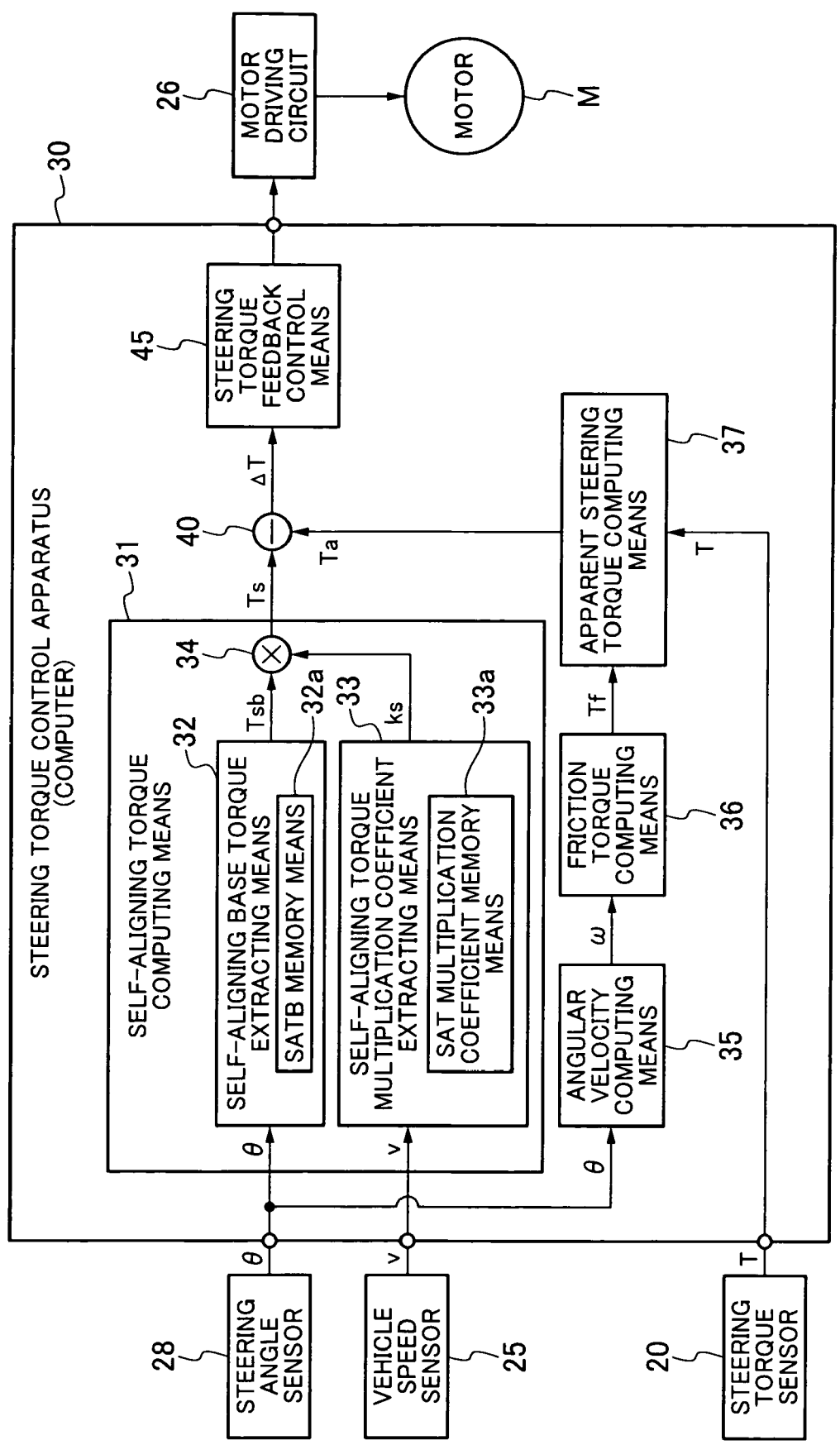
FIG. 3 is a skeleton block diagram of a steering torque control apparatus.

FIG. 3 shows a skeleton block diagram of a steering torque control apparatus 30 driving and controlling the assist motor M by a computer so as to assist the steering force.

The steering torque control apparatus 30 outputs a command signal (a PWM signal) to a motor driving circuit 26, and the motor driving circuit 26 drives the assist motor M in accordance with the PWM signal.

In addition to the steering torque T detected by the steering torque sensor 20 and the steering angle θ detected by the steering sensor 28, a vehicle speed v detected by a vehicle speed sensor 25 is input to the steering torque control apparatus 30.

The steering torque control apparatus 30 is provided with four computing means comprising a self-aligning torque computing means 31, an angular velocity computing means 35, a friction torque computing means 36, and an apparent steering torque computing means 37.

The angular velocity computing means 35 is structured so as to compute a steering angular velocity ω by differentiating by time the steering angle θ detected by the steering angle sensor 28.

The self-aligning torque computing means 31 is provided with a self-aligning base torque extracting means 32 and a self-aligning torque multiplication coefficient extracting means 33.

The self-aligning base torque extracting means 32 extracts a self-aligning base torque Tsb based on of the steering angle θ from a self-aligning base torque (SATB) memory means 32a storing a relation of the self-aligning base torque with respect to the steering angle in the reference vehicle speed.

Figure 4:
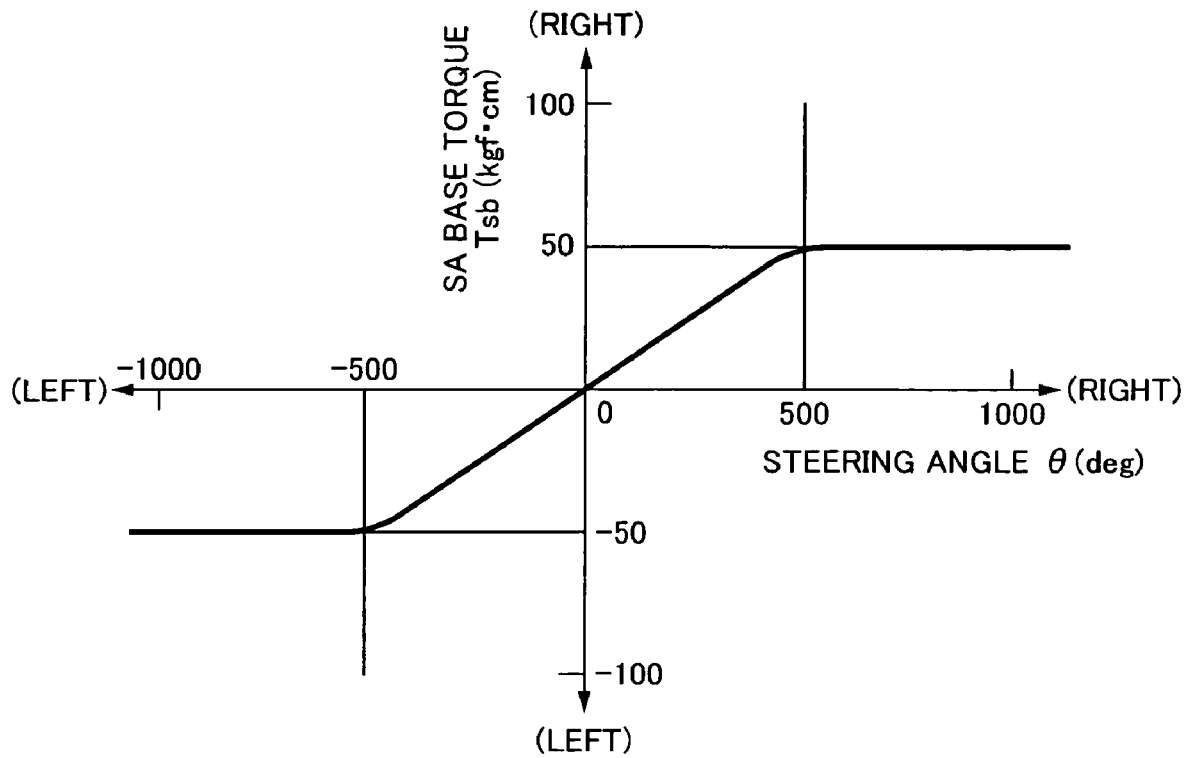
FIG. 4 is a view showing a relation map of a self-aligning base torque Tsb with respect to a steering angle $\theta$ in a reference vehicle speed.

A coordinate in FIG. 4 shows a relation map of the self-aligning base torque Tsb with respect to the steering angle θ at a reference vehicle speed $V_0$ stored by the self-aligning base torque memory means 32a.

In FIG. 4, the steering angle θ in a horizontal axis indicates a right steering angle (θ>0) by a positive value, and indicates a left steering angle θ<0) by a negative value.

In this case, the self-aligning base torque Tsb in a vertical axis indicates a torque in a right direction (Tsb>0) by a positive value, and indicates a torque in a left direction (Tsb<0) by a negative value, and corresponds to a reaction force of the actual self-aligning torque.

Accordingly, for example, if the right steering angle θ (>0) becomes large, the self-aligning base torque Tsb (>0) in the right direction corresponding to an opposite direction to the actual direction also becomes large.

Another self-aligning torque multiplication coefficient extracting means 33 provided in the self-aligning torque computing means 31 extracts a self-aligning torque multiplication coefficient ks based on a vehicle speed v from a self-aligning torque (SAT) multiplication coefficient memory means 33a storing the self-aligning torque multiplication coefficient with respect to the vehicle speed.

Figure 5:
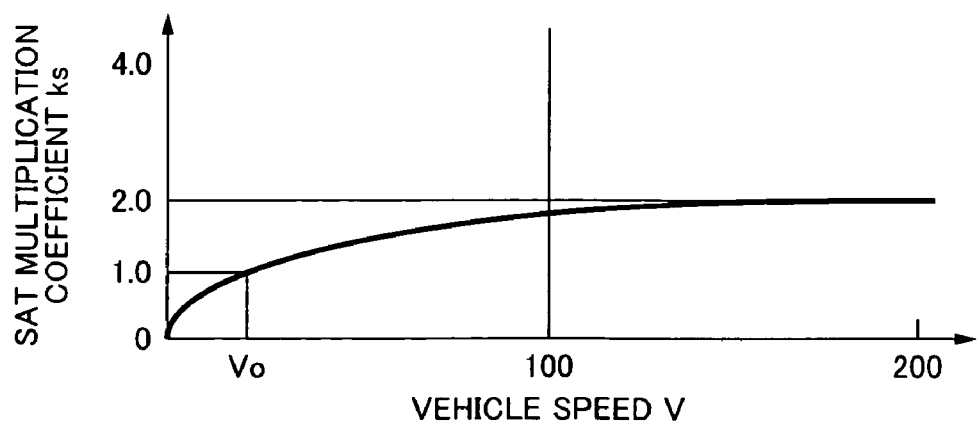
FIG. 5 is a view showing a relation map of a self-aligning torque multiplication coefficient ks with respect to a vehicle speed v by a coordinate.

FIG. 5 shows the relationship of the self-aligning torque multiplication coefficient ks with respect to the vehicle speed V stored by the self-aligning torque multiplication coefficient memory means 33a.

In FIG. 5, the value of the self-aligning torque multiplication coefficient ks is increased in accordance with an increase of the vehicle speed v.

The self-aligning torque multiplication coefficient ks is equal to 1.0 at a time of the reference vehicle speed $V_0$.

The self-aligning torque computing means 31 multiplies the self-aligning base torque Tsb extracted by the self-aligning base torque extracting means 32 based on the steering angle θ by the self-aligning torque multiplication coefficient ks extracted by the self-aligning torque multiplication coefficient extracting means 33 based on the vehicle speed V by means of a multiplying means 34, and calculates the self-aligning torque Ts.

In this case, the self-aligning torque Ts here corresponds to a reaction force having an opposite direction to the actual self-aligning torque, and indicates the steering torque which tends to maintain the steering angle against the self-aligning torque.

The self-aligning base torque Tsb is reduced in accordance with the vehicle speed v becoming smaller than the reference vehicle speed $V_0$, and the self-aligning torque Ts is amplified in accordance with the vehicle speed v becoming larger than the reference vehicle speed $V_0$, by multiplying the self-aligning base torque Tsb by the self-aligning torque multiplication coefficient ks.

On the other hand, a friction torque computing means 36 computes a friction torque Tf based on the steering angular velocity ω computed by the angular velocity computing means 35, and determines a friction torque Tf(=ω·kf) by multiplying the steering angular velocity ω by the conversion coefficient kf.

In this case, the friction torque Tf corresponds to a friction torque serving as a reaction force of a friction torque, such as a dynamic friction of a tire at a time of changing the steering angle or the like.

The apparent steering torque computing means 37 calculates an apparent steering torque Ta (=T−Tf=T−ω·kf) by subtracting the friction torque Tf computed by the friction torque computing means 36 from the steering torque T detected by the steering torque sensor 20.

The apparent steering torque Ta corresponds to an apparent steering torque obtained by subtracting a friction torque corresponding portion Tf from the actual steering torque T.

Since a relation of steering angular velocity ω=0 is established at a keep steering time of keeping the steering angle, the apparent steering torque Ta becomes the steering torque T itself.

Since the actual steering torque T and the steering angular velocity ω have the same sign at a time of turning the steering wheel, the apparent steering torque Ta becomes a smaller value than the actual steering torque T (Ta<T).

Since the actual steering torque T and the steering angular velocity ω become different signs at a time of turning back the steering wheel, the apparent steering torque Ta becomes a larger value than the actual steering torque T (Ta>T).

Further, a steering torque deviation ΔT (=Ts−Ta) is determined by setting the self-aligning torque Ts computed by the self-aligning torque computing means 31 to a target steering torque, and subtracting the apparent steering torque Ta computed by the apparent steering torque computing means 37 from the target steering torque (the self-aligning torque Ts).

The steering torque deviation ΔT is input to a steering torque feedback control means 45, and an assist motor M is driven and controlled in such a manner that the steering torque deviation ΔT becomes 0 and comes close to the target steering torque (the self-aligning torque Ts).

Accordingly, since the assist drive control is executed by the large steering torque deviation ΔT based on the smaller apparent steering torque Ta than the actual steering torque T at a time of turning the steering wheel, the assist motor M outputs a large assist amount. On the contrary, since the assist drive control is executed by the small steering torque deviation ΔT based on the larger apparent steering torque Ta than the actual steering torque T at a time of turning back the steering wheel, the assist motor M outputs a small assist amount.

Figure 6:
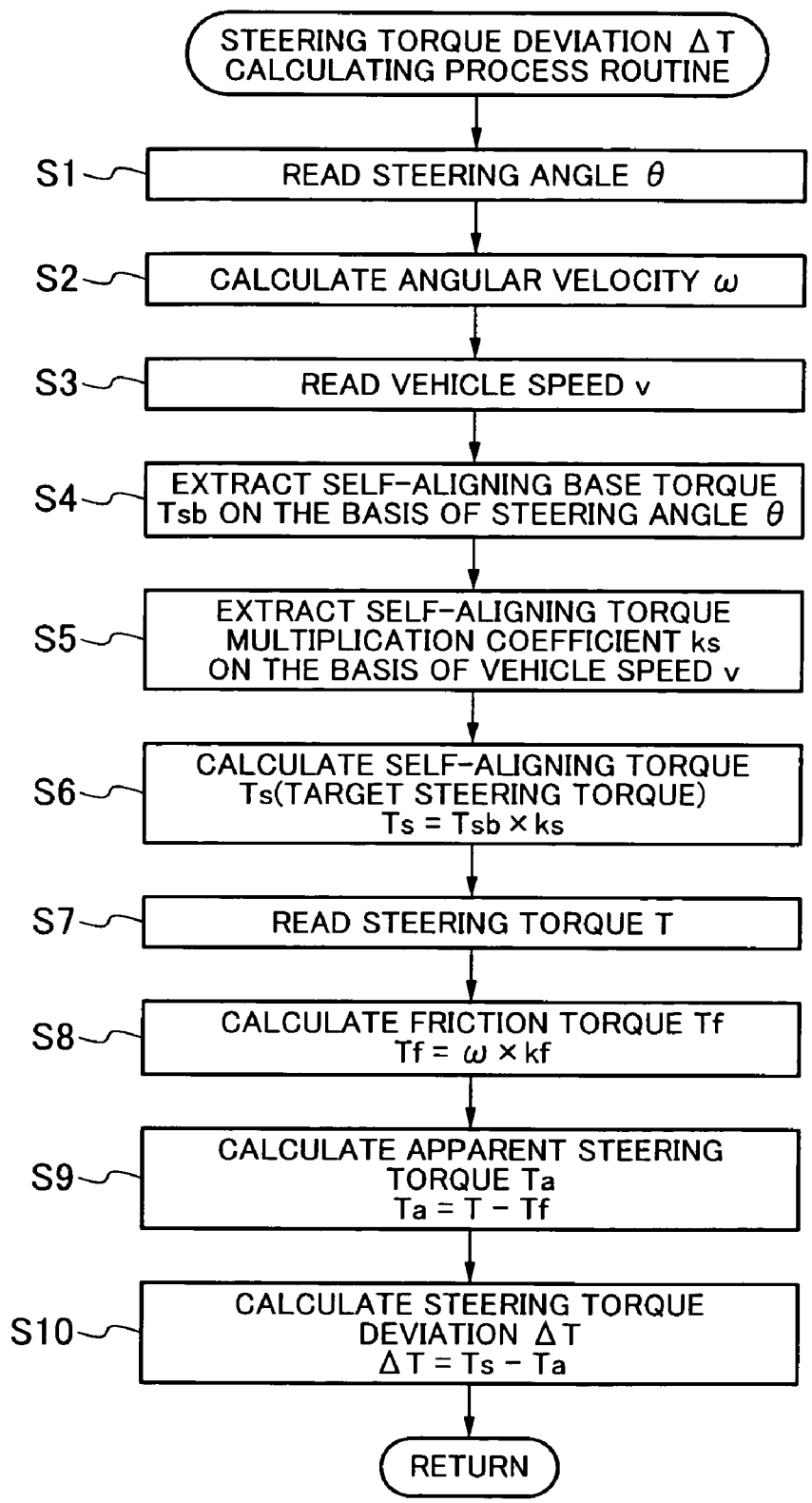
FIG. 6 is a flow chart showing a calculating process procedure of a steering torque deviation.

The above-described procedure performed until the steering torque deviation ΔT is calculated is shown in FIG. 6 by a flow chart.

First, the steering angle θ detected by the steering angle sensor 28 is read (S1). Then, the steering angular velocity ω is calculated by the angular velocity computing means 35 (S2). And, the vehicle speed v detected by the vehicle speed sensor 25 is read (S3).

Next, the self-aligning base torque Tsb is extracted based on the steering angle θ by the self-aligning base torque extracting means 32 (S4), the self-aligning torque multiplication coefficient ks is extracted based on the vehicle speed v by the self-aligning torque multiplication coefficient extracting means 33 (S5), and the self-aligning torque Ts corresponding to the target steering torque is calculated by multiplying the self-aligning base torque Tsb by the self-aligning torque multiplication coefficient ks (S6).

Next, the steering torque T detected by the steering torque sensor 20 is read (S7), the friction torque Tf is calculated by multiplying the steering angular velocity ω by the conversion coefficient kf by means of the friction torque computing means 36 (S8), and the apparent steering torque Ta is calculated by subtracting the friction torque Tf from the steering torque T by means of the apparent steering torque computing means 37 (S9).

Further, in S10, a difference between the target steering torque (the self-aligning torque Ts) and the apparent steering torque Ta is obtained, and the steering torque deviation ΔT is calculated.

The processes in the respective steps described above are repeatedly executed, and the steering torque deviation ΔT is progressively computed.

The steering torque deviation ΔT calculated as described above is input to the steering torque feedback control means 45.

The steering torque feedback control means 45 is constituted by a proportional integral (PI) control means and a PWM control signal generating means, the PI control means computes an optimum control amount of the feedback by combining a proportional (P) operation and an integral (I) operation from the deviation ΔT for setting the deviation ΔT to 0 so as to obtain the target steering torque Ts, and the PWM control signal generating means converts the optimum control amount into the control signal of the duty ratio of the PWM so as to output to the motor driving circuit 26.

The motor driving circuit 26 supplies the current in accordance with the duty ratio of the PWM control signal to the assist motor M so as to drive the assist motor M and assist the steering force.

The self-aligning torque Ts becomes smaller particularly at the low vehicle speed, however, the friction torque Tf, such as the dynamic friction of the tire with respect to the road surface, indicates a relatively larger value in such a manner as to compensate the steering angle change at a time of turning the steering wheel and turning back the steering wheel.

Therefore, at a time of the low vehicle speed, the rate of the friction torque Tf is large in the actual steering torque T, and the friction torque Tf largely affects the value of the steering torque deviation ΔT obtained by subtracting the apparent steering torque Ta from the target steering torque Ts at a time of the low vehicle speed, in addition to the apparent steering torque Ta obtained by subtracting the friction torque Tf from the actual steering torque T.

Since the assist motor M is driven and controlled based on the steering torque deviation ΔT largely affected by the friction torque Tf as described above, it is possible to compensate for the influence of the tire friction with respect to the road surface greatly appearing at low vehicle speed, and it is possible to always achieve a stable steering feeling.

As mentioned above, in accordance with the motor-driven power steering apparatus of one or more embodiments of the present invention, since the assist motor is feedback driven and controlled in such a manner as to set the self-aligning torque computed based on the steering angle and the vehicle speed to the target steering torque and make the apparent steering torque obtained by subtracting the friction torque computed based on the steering angular velocity from the detected steering torque close to the target steering torque, it is possible to stabilize the steering feeling which tends to becomes unstable at a time of low vehicle speed, by controlling the assist motor based on the apparent steering torque obtained by subtracting the large friction torque from the actual steering torque at a time of the low vehicle speed when the friction torque, such as the dynamic friction of the tire wheel with respect to the road surface, indicates a large value in accordance with the steering angle change at a time of turning the steering wheel and turning back the steering wheel.

Further, in accordance with the motor-driven power steering apparatus of one or more embodiments of the present invention, since the self-aligning torque is calculated by multiplying the self-aligning base torque extracted from the self-aligning base torque memory means by the self-aligning torque multiplication coefficient extracted from the self-aligning torque multiplication coefficient memory means, it is possible to quickly introduce the self-aligning torque based on the steering angle and the vehicle speed.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus in which a driving force of an assist motor assists a steering force, comprising:
    a torque sensor detecting a steering torque;
    a vehicle speed sensor detecting a vehicle speed;
    a steering angle detecting means for detecting a steering angle;
    an angular velocity computing means for detecting a steering angle or an angular velocity of a motor rotating angle;
    a self-aligning torque computing means for computing a self-aligning torque on the basis of the steering angle detected by the steering angle detecting means and the vehicle speed detected by the vehicle speed sensor;
    a friction torque computing means computing a friction torque in accordance with a steering angle change from the steering angular velocity computed by the angular velocity computing means;
    an apparent steering torque computing means for computing an apparent steering torque from the friction torque computed by the friction torque computing means and the steering torque detected by the torque sensor; and
    a steering torque feedback control means for driving and controlling the assist motor in such a manner that a difference between the self-aligning torque computed by the self-aligning torque computing means and the apparent steering torque computed by the apparent steering torque computing means becomes 0,
    wherein the apparent steering torque is calculated by subtracting the friction torque from the steering torque,
    wherein the self-aligning torque is calculated to increase with an increase in the vehicle speed and a change rate of the calculated self-aligning torque to the vehicle speed decreases with an increase in the vehicle speed.

2. A motor-driven power steering apparatus as claimed in claim 1, wherein the self-aligning torque computing means comprises:
    a self-aligning base torque extracting means for extracting a self-aligning base torque from a self-aligning base torque memory means for storing a relation of the self-aligning base torque with respect to a steering angle in a predetermined reference vehicle speed on the basis of the steering angle; and
    a self-aligning torque multiplication coefficient extracting means for extracting a self-aligning torque multiplication coefficient from a self-aligning torque multiplication coefficient memory means for storing a relation of the self-aligning torque multiplication coefficient with respect to the predetermined vehicle speed on the basis of the vehicle speed, and
    wherein the self-aligning torque computing means calculates the self-aligning torque by multiplying the self-aligning base torque by the self-aligning torque multiplication coefficient.

3. A motor-driven power steering apparatus as claimed in claim 1, wherein the steering torque feedback control means is constituted by a PI control means and a PWM control signal generating means, the PI control means computes an optimum control amount for feedback by combining a proportional operation and an integral operation for setting a deviation to 0 from $\Delta T$ so as to obtain a target steering torque, and the PWM control signal generating means converts the optimum control amount into a control signal of a duty ratio of the PWM so as to output to the motor driving circuit, and
    wherein the motor driving circuit supplies a current in accordance with the duty ratio of the PWM control signal to the assist motor so as to drive the assist motor and assist the steering force.

4. A motor-driven power steering apparatus as claimed in claim 2, wherein the steering torque feedback control means is constituted by a PI control means and a PWM control signal generating means, the PI control means computes an optimum control amount for feedback by combining a proportional operation and an integral operation for setting a deviation to 0 from $\Delta T$ so as to obtain a target steering torque, and the PWM control signal generating means converts the optimum control amount into a control signal of a duty ratio of the PWM so as to output to the motor driving circuit, and
    wherein the motor driving circuit supplies a current in accordance with the duty ratio of the PWM control signal to the assist motor so as to drive the assist motor and assist the steering force.

5. A motor-driven power steering apparatus as claimed in claim 1, wherein the steering torque feedback control means is constituted by a PI control means and a PWM control signal generating means, the PI control means computes an optimum control amount for feedback by combining a proportional operation and an integral operation for setting a deviation to 0 from $\Delta T$ so as to obtain a target steering torque, and the PWM control signal generating means converts the optimum control amount into a control signal of a duty ratio of the PWM so as to output to the motor driving circuit, and
    wherein the motor driving circuit supplies a current in accordance with the duty ratio of the PWM control signal to the assist motor so as to drive the assist motor and assist the steering force.

6. A motor-driven power steering apparatus as claimed in claim 1, wherein the steering torque feedback control means is constituted by a PI control means and a PWM control signal generating means, the PI control means computes an optimum control amount for feedback by combining a proportional operation and an integral operation for setting a deviation to 0 from $\Delta T$ so as to obtain a target steering torque, and the PWM control signal generating means converts the optimum control amount into a control signal of a duty ratio of the PWM so as to output to the motor driving circuit, and
    wherein the motor driving circuit supplies a current in accordance with the duty ratio of the PWM control signal to the assist motor so as to drive the assist motor and assist the steering force.

* * * * *